Figure 1:
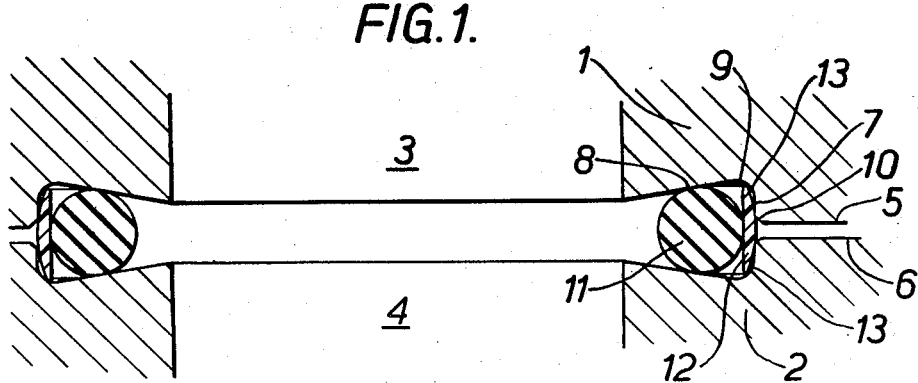

United States Patent [19]
Marshall

[11] 3,870,322
[45] Mar. 11, 1975

[54] FLUID-TIGHT SEALS AND METHODS OF MAKING THEM

[75] Inventor: John Stephen Marshall, Woking, England

[73] Assignee: Sperry Rand Limited, London, England

[22] Filed: Oct. 19, 1973

[21] Appl. No.: 407,968

[30] Foreign Application Priority Data
Oct. 19, 1972  Great Britain .................... 48171/72

[52] U.S. Cl. .............. 277/167.5, 277/171, 277/188, 285/336
[51] Int. Cl. ........................... F16j 9/00, F16l 21/02
[58] Field of Search ........... 277/168, 169, 171, 170, 277/188, 167.5; 285/336

[56] References Cited
UNITED STATES PATENTS

| | | | |
|---|---|---|---|
| 2,458,817 | 1/1949 | Wolfram ...................... | 277/170 UX |
| 2,757,994 | 8/1956 | Snyder ................................ | 277/188 |
| 2,783,295 | 2/1957 | Ewing .............................. | 277/32 X |
| 3,019,281 | 1/1962 | Hartwell ....................... | 277/180 UX |
| 3,794,361 | 2/1974 | Westberg ........................... | 285/336 |

*Primary Examiner*—Samuel B. Rothberg
*Attorney, Agent, or Firm*—Barnes, Kisselle, Raisch & Choate

[57] ABSTRACT

A method of forming a fluid-tight seal between two surfaces including the steps of forming at the surfaces to be sealed an annular recess for the sealing elements, the recess having a cylindrical outer surface and being wedge-shaped in radial section, tapering inwards, and with a radius curve between the outer and the wedge surfaces, and fitting into the recess sealing elements comprising an O-ring surrounded by a collar of a plastics material which is flexible but does not flow under the conditions in which the seal is required to operate, the relative dimensions being such that the ring and collar are deformed on tightening the seal, and then tightening the surfaces together to compress the O-ring and to deform the collar against the surfaces of the sealing recess.

10 Claims, 3 Drawing Figures

FLUID-TIGHT SEALS AND METHODS OF MAKING THEM

The present invention relates to fluid-tight seals.

Often it is necessary, for example in hydraulic or pneumatic apparatus, to provide a means for sealing together two surfaces provided with bores for fluid in such a manner that the seal can withstand high fluid pressures without leakage.

One form of seal commonly used for the purpose is the O-ring seal. In such seals a sealing recess is provided in one or both surfaces to accommodate an O-ring, that is to say, a ring of circular section made of synthetic rubber or similar elastomeric material and so dimensioned that the O-ring is slightly compressed when the seal is assembled. One disadvantage of O-ring seals is that, while they are capable of withstanding static high pressures, they are liable to leak when the pressure applied fluctuates between wide limits. This is partly because, particularly if the surfaces of the recess are not very highly finished, they have a pumping action as the pressure fluctuates, a small quantity of fluid being able to escape at each pressure change cycle. Furthermore the material of the O-ring behaves as a fluid at very high pressures, being extruded into the gap between the sealing surfaces, and so damaging the O-ring. A further disadvantage is that in some cases, particularly in hydraulic apparatus, the pressure within the bore may fall momentarily to below the ambient pressure, in which case the O-ring may be sucked out of the sealing recess and into the bore, thus destroying the integrity of the seal, unless retaining means are used, which are usually expensive and increase the area under pressure to be sealed.

It is an object of the present invention to provide a construction of seal for sealing two surfaces together in a fluid-tight manner which is less subject to these disadvantages.

According to the present invention, a pressure-tight O-ring seal between two surfaces comprises an annular recess with a cylindrical outer wall merging by curves into the side walls of the recess, and containing the O-ring surrounded by a thin collar of a plastics material which is flexible but does not flow under the conditions in which the seal is required to operate, the width of the collar being such that it is deformed at its contact with the side walls.

Preferably the side-walls of the recess are conical, the recess tapering towards the axis of the seal.

It will usually be convenient to form the recess in two symmetrical halves, one in each of the surfaces to be sealed together, and the edge of each half of the recess may be slightly rounded or chamfered. The collar need not be a tight fit in the recess, but it is convenient to make it to fit lightly over the O-ring so that the two can be pressed together and handled as a single unit in assembly. Unless the collar is extremely thin, it is advantageous to form a bevel or chamfer on the outer side at both ends.

The plastics material for the collar may be any which does not flow but which remains flexible under the conditions in which the seal is required to operate. Nylon is generally suitable, being resistant to water and to most hydraulic oils, and polyurethane and polypropylene may also be used in suitable circumstances. On the other hand, elastomeric materials and PTFE are not suitable, since they behave as fluids at very high pressures. Most thermosetting plastics will usually be too brittle and not sufficiently flexible for use with the invention in normal circumstances.

Figure 2:
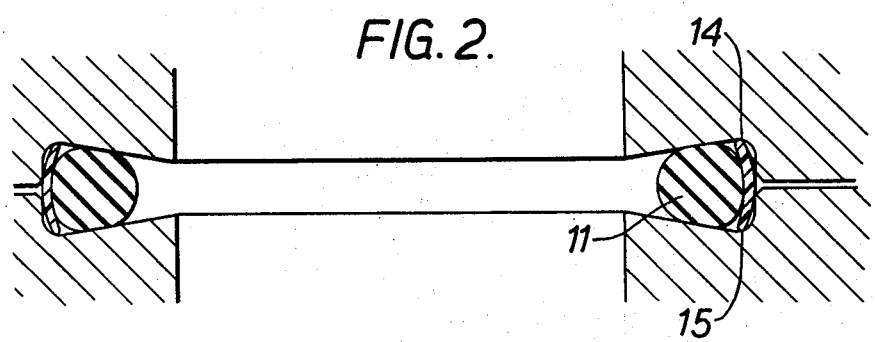
Figure 3:
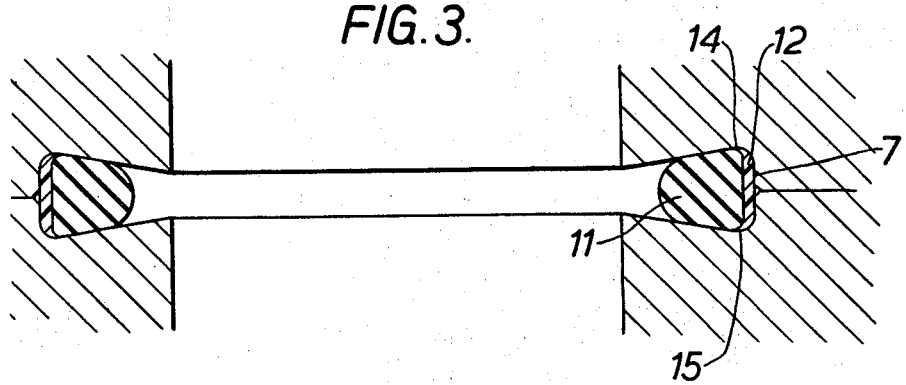

The invention will be further described by way of example with reference to the accompanying drawings in which:

FIG. 1 is a radial section of a seal according to the invention, showing the components in position before the seal surfaces are tightened together, FIG. 2 is the view of FIG. 1 during the tightening step, showing how the components are deformed, and FIG. 3 is a similar view of the seal after it has been subjected to pressure.

Referring first to FIG. 1, two metal plates 1, 2, which may, for example, be respectively the base of a hydraulic control valve and a mounting plate, are provided with bores 3, 4 for the passage of hydraulic fluid under pressure. The plates have machined surfaces 5, 6 which, when the apparatus is fully assembled, are tightly clamped together by tie bolts (not shown).

Recesses for the sealing elements are machined in both plates. These are exactly similar in form, and for brevity only those in the upper plate, 1, will be described in detail.

The sealing recess in the upper plate has a cylindrical outer wall 7 merging into an inclined conical surface 8, the intermediate corner being formed with a smooth curve 9. Together with the corresponding recess in the lower plate 2 this forms an annular recess of wedge-shaped cross section with its apex directed inwards. The corner where the cylindrical surface 7 meets the flat surface 5 of the plate is also slightly rounded or chamfered as shown at 10.

In the recess formed in this way are placed an elastomeric O-ring 11 and a thin collar of nylon 12. The nylon collar 12 has its outer surface chamfered as shown at 13. The diameter of the collar is such that it is an easy fit inside the cylindrical wall 7 and a light push fit over the O-ring. The widths of these elements are such that they will be appreciably compressed when the seal surfaces are tightened together.

FIG. 2 shows how these elements are deformed during tightening of the seal. As the seal is tightened, the O-ring 11 is compressed and flattened against the inside of the collar 12, causing it to bulge outwards slightly. The inside surfaces of the recess make contact along the edges of the nylon collar at 14 and 15.

FIG. 3 is a section of the same seal after it has been fully tightened and fluid pressure has been applied to the inside of the bores. The O-ring 11 has been forced against the nylon collar 12 deforming it into close contact with the cylindrical outer wall 7. At very high pressures the material of the O-ring 11 behaves as a fluid, so that the fluid pressure in the bores is uniformly transmitted to the inside of the nylon collar. However, the nylon collar itself, although flexible, is incapable of flowing, and retains some rigidity. Because of this the pressure of the edges of the nylon collar against the inside of the sealing recess at 14 and 15 is in excess of the hydrostatic pressure within the O-ring, and it is impossible for the O-ring to be extruded past this sealing edge. Furthermore, since the O-ring is securely contained, pumping action does not take place on fluctuation of pressure, and leakage from this source is avoided. It is also less easy for the O-ring to become dragged into the interior of the bore should the pressure within the bore momentarily fall to less than that of the outside atmosphere.

It will be noted that the seal is relatively inexpensive, since O-rings and nylon tubes are not costly, and an extremely high degree of finish of the surfaces of the sealing recess is less important than in conventional O-ring seals. Also, since the sealing surfaces are below the level of the surrounding surfaces, they are protected from damage during handling and assembly.

In one seal constructed according to the invention the dimensions of the components were as follows:

Overall diameter of sealing groove 1 3/16 inch in each face
Maximum depth of sealing groove 5/64 inch in each face
O-ring to BS 1806-1962 1 inch nominal O/d 0.139 inch nominal section
Collar 1 5/32 inch O/d 5/32 inch high For the purposes of test the faces to be sealed were shaped 0.0025 inch apart to form an exaggerated extrusion gap.

This seal was assembled as described above, and then subjected to a fluctuating hydraulic pressure varying from a minimum of less than 10 pounds per square inch to a maximum of 5,600 pounds per square inch. After being subjected to over 2 million cycles of pressure fluctuation, no perceptible leakage occurred.

I claim:

1. A pressure-tight O-ring seal between two surfaces comprising an annular recess having a cylindrical outer wall and a pair of side walls, said outer wall merging by curves into the side walls of the recess, an O-ring in said recess, a thin collar of a plastics material which is flexible but does not flow under the conditions in which the seal is required to operate, said collar surrounding said O-ring, the width of the collar being slightly greater than the axial width of said recess such that said collar is deformed at its contact with the side walls.

2. A pressure-tight seal according to claim 1 in which the side walls of the recess are conical, the recess tapering towards the axis of the seal.

3. A pressure-tight seal according to claim 1 in which the recess is formed in two symmetrical halves, one in each of the surfaces to be sealed together.

4. A pressure-tight seal according to claim 3 in which the outer edge of each half of the recess is slightly rounded or chamfered.

5. A pressure-tight seal according to claim 4 in which the collar is a light press fit over the O-ring before the seal is assembled.

6. A pressure-tight seal according to claim 5 in which the collar is formed with a bevel or chamfer on its outer side at both ends.

7. A pressure-tight seal according to claim 6 in which the collar is of nylon.

8. A pressure-tight seal according to claim 1 in which the collar is a light press fit over the O-ring before the seal is assembled.

9. A pressure-tight seal according to claim 1 in which the collar is formed with a bevel or chamfer on its outer side at both ends.

10. A pressure-tight seal according to claim 1 in which the collar is of nylon.

* * * * *